Patented June 17, 1952

2,600,383

UNITED STATES PATENT OFFICE 2,600,383

COPOLYMERS FROM ALLYL ESTERS AND METHACRYLIC ESTERS

La Verne N. Bauer, Philadelphia, Harry T. Neher, Bristol, and William L. Van Horne, Philadelphia, Pa., assignors to Rohm & Haas Company, Philadelphia, Pa., a corporation of Delaware No Drawing. Application July 15, 1949, Serial No. 105,042

4 Claims. (Cl. 260—86.1)

This invention relates to copolymers from allyl esters and methacrylic esters and to compositions comprising said copolymers dissolved in hydrocarbon fluids having a waxy pour point.

For some time it has been known that oils may be thickened by dissolving therein resinous or polymeric material. In some instances compositions are thus produced which have improved properties as to change of viscosity with temperature. Some polymeric materials raise the pour point of liquid hydrocarbons, others have no effect on this property, and still others may depress the pour point. This last effect has not been predictable.

We have observed that polymers of allyl stearate, allyl palmitate, methallyl laurate, allyl octoate, allyl butyrate, and the like on the one hand, and on the other hand nonyl methacrylate, octyl methacrylate, cetyl methacrylate, stearyl methacrylate, and the like, or mechanical mixtures of individual polymers of such esters are ineffective in depressing the pour point of wax-containing oils. It was, therefore, a distinctly unexpected result to discover that specific copolymers of (A) an ester of allyl, 2-chloroallyl, or 2-methallyl alcohol and a saturated aliphatic monocarboxylic acid having a chain of sixteen to twenty-four carbon atoms and (B) an ester of methacrylic acid and a saturated aliphatic alcohol having a chain of six to twelve carbon atoms are effective pour point depressants. In the specific copolymers based on these particular esters, the two types of esters must be copolymerized within proportions varying from two moles of the former (A) per mole of the latter (B) to one mole of the former (A) per a number of moles of the latter (B) which is one third of the number of carbon atoms in the longest chain in the methacrylic ester.

There may thus be copolymerized one molecular proportion of an allyl ester of a long-chained fatty acid, such as allyl palmitate, allyl margarate, allyl stearate, allyl tetracosanate, or the equivalent, with, for example, one half up to two moles of hexyl methacrylate. Suitable proportions of such an allyl ester and dodecyl methacrylate are one mole of the former to one half up to four moles of the methacrylate.

In place of the above named allyl esters other allyl carboxylates having a carbon chain of sixteen to twenty-four carbon atoms may be used. In place of the allyl group there may be used with the same effect the methallyl, $CH_2=C(CH_3)CH_2-$ or chloroallyl, $CH_2=CClCH_2-$, groups. These allyl esters are prepared by known methods, such as direct esterification of alcohol with acid or anhydride, or as the use of an acyl halide.

The useful allyl esters are defined by the formula $CH_2=C(R^1)CH_2OCOR^2$ where $R^1$ is hydrogen, a methyl group, or chlorine, and $R^2$ is an alkyl group having a chain of fifteen to twenty-three carbon atoms.

The methacrylic esters are likewise available through known methods. The suitable esters have the formula $CH_2=C(CH_3)COOR$ where R is an alkyl group having a carbon chain of six to twelve carbon atoms. The alkyl group may be of straight or branched-chain structure. With branching groups the longest single chain determines the upper proportion of methacrylic ester which is copolymerized with an allyl carboxylate to give a pour point depressant. Thus, since the n-hexyl group, the 2-ethylhexyl group and the 3,5,5-trimethylhexyl groups all have the same length of chain and all give much the same result, the methacrylic esters containing these groups have the same upper limits for production of effective copolymers.

In the preparation of the copolymers one or more of the defined allyl esters and one or more of the defined methacrylic esters are mixed in an inert organic solvent and polymerized by heating with an organic peroxide. Solvents such as benzene, toluene, xylene and naphtha are particularly suitable. Temperatures of 70° C. to 160° C. are useful. After the copolymer has been formed in solution, it may be taken up in a mineral oil and the solvent eliminated by heating under reduced pressure.

Useful catalyst include acetyl peroxide, caproyl peroxide, lauroyl peroxide, benzoyl peroxide, dibenzoyl peroxide, di-tert.-butyl diperphthalate, tert.-butyl perbenzoate, 2,2-bis(tert.-butyl-peroxy)butane, methyl ethyl ketone peroxide, di-tert.-butyl peroxide, and tert.-butyl hydroperoxide. One or more of such catalysts may be used in amounts of 2% to 15% of the weight of esters to be copolymerized. The catalyst is desirably added from time to time as copolymerization proceeds. While copolymerization may usually be started with a low concentration of peroxide, such as 2% of the weight of the mixed monomers, it is desirable to add peroxide from time to time up to a total of 15% or more in order to promote copolymerization within a reasonable time and in good yield.

Presence of an inert atmosphere is very desirable during copolymerization. This may be accomplished by flushing the reaction vessel with an inert gas, such as nitrogen, or blanketing the reaction mixture with the vapors of a volatile, inert organic solvent.

Useful procedures for preparing copolymers of this invention are shown in greater detail in the illustrative examples which follow.

Example 1

A mixture was prepared from 70 parts by weight of toluene, 17 parts of benzoyl peroxide, 70 parts of allyl stearate, and 144 parts of dodecyl methacrylate. About 50 parts of this mixture was placed in a reaction vessel which was swept out with nitrogen, stirred, and heated to 100° C. In about five minutes copolymerization began and the rest of the mixture was added thereto in small increments over the course of two hours. At the end of the third hour and again at the end of the fourth hour a batch of 5 parts of benzoyl peroxide was added. After six hours 200 parts of toluene was added and after 6.3 hours there was added two parts of benzoyl peroxide in 50 parts of toluene. After 6.3 hours 0.8 part of benzoyl peroxide was added.

The total reaction time was about eight hours. There was obtained a solution containing 38.2% of copolymer in a yield of 89%. The viscosity of a 30% solution in toluene was 141.8 cs. at 100° F.

Example 2

A mixture was prepared from 5 parts of allyl tetracosanate, 15 parts of dodecyl methacrylate, 10 parts of toluene, and 1 part of benzoyl peroxide was heated under nitrogen in a reaction vessel. After two hours at 105°–110° C. there was added 0.4 part of benzoyl peroxide in one part of toluene. After 4.5 hours the temperature was maintained at 101°–104° C. during the rest of the heating period. At the end of the fifth, sixth, and seventh hours there was added 1.25, 0.4, and 0.2 parts of benzoyl peroxide respectively, each addition being in toluene. Heating was discontinued after eight hours. The product was 23.1% solution of copolymer, corresponding to a yield of 90.1% on the weight of monomeric esters used.

The copolymer was transferred to a light petroleum oil by mixing the toluene solution with oil and heating the mixture under reduced pressure. Final heating was done at 140° C./2 mm. There was thus obtained a 35% solution of the copolymer in oil. This concentrate was useful for addition to other oils in proper proportion to give compositions of reduced pour point. A 0.5% solution of this copolymer in a 150 Pennsylvania neutral having a 25° F. pour point reduced the pour point to −5° F.

Example 3

There were mixed 60 parts of allyl palmitate, 45 parts of isoheptyl methacrylate, 25 parts of toluene, and 5 parts of benzoyl peroxide. This mixture was added during the course of about two hours to a reaction vessel equipped with a stirrer, flushed with nitrogen, and heated at 119° C. The temperature was allowed to fall to 109° C. and after three hours 2 parts of benzoyl peroxide was added. During the rest of the copolymerization time the temperature was kept between 95° C. and 104° C. At the end of four hours 5 parts of benzoyl peroxide in 8.7 parts of toluene was added. At the end of five hours 2 parts of benzoyl peroxide in 8.7 parts of toluene was added. At the sixth hour 0.8 part of benzoyl peroxide was added and at the seventh hour 108 parts of toluene. Heating was discontinued ten minutes later. The copolymer content of the solution was 42.4%, corresponding to a yield of 97.5%. The viscosity of a 30% solution of the copolymer was 15.7 cs. at 100° F.

A 0.5% solution of this copolymer in a 150 Pennsylvania neutral of a normal +25° F. pour point had a reduced pour point of −30° F.

Example 4

A mixture of 65 parts of methallyl stearate, 35 parts of 3,5,5-trimethylhexyl methacrylate, and 8 parts of benzoyl peroxide was gradually added to a reaction vessel which was swept out with nitrogen. The reaction vessel was heated to 115°–120° C. At the end of three hours a solution of 3.2 parts of benzoyl peroxide in 8.7 parts of toluene was added and heating was continued at 113° C. for 1.2 hours. The temperature was then dropped to 102° C. and 8 parts of benzoyl peroxide in 17.4 parts of toluene was added. At 5.5 hours 3.2 parts of benzoyl peroxide in 8.7 parts of toluene was added. At 6.5 hours 1.3 parts of benzoyl peroxide in 8.7 parts of toluene was added and the temperature was raised to 108° C. At 7.5 hours 56 parts of toluene was added and 10 minutes later heating was continued. The product was a 50.5% solution of copolymer, corresponding to a yield of 95.9%. The viscosity of a 30% solution of the copolymer in toluene was 3.4 cs. at 100° F.

Example 5

The above procedure was repeated with 36.5 parts of allyl palmitate and 63.5 parts of n-octyl methacrylate (a 1:2.6 mole ratio). A total of two parts of benzoyl peroxide and 17 parts of toluene were used in all. The copolymerization was carried out at 80°–81° C. during the course of 16 hours. The yield was 60% of copolymer in a 45% toluene solution.

Example 6

A mixture of 51.5 parts of 2-chloroallyl stearate and 48.5 parts of dodecyl methacrylate in 50 parts of toluene containing 0.5 part of benzoyl peroxide was heated at 112°–120° C. until copolymerization had started. The mixture was then heated at 103° C. and increments of benzoyl peroxide and toluene added from time to time, 2 parts of the peroxide and 100 parts of toluene in all being used.

The product obtained was a 46.7% solution of copolymer of a 1:1.25 ratio in a yield of 81.8%. The viscosity of a 30% solution of copolymer in toluene was 176.9 cs. at 100° F.

Example 7

A mixture of 59.2 parts of allyl palmitate, 40.8 parts of n-hexyl methacrylate, 50 parts of toluene, and 1.5 parts of benzoyl peroxide was heated at 110°–118° C. until after copolymerization had started and then at 100°–105° C. until the end of the eight hour heating period. Benzoyl peroxide and toluene were added from time to time as in previous examples. The yield of copolymer was 93% in a 33% solution.

The copolymers of long-chained allyl esters and methacrylic esters, the preparation of which has been described and illustrated in the above examples, were dissolved in several kinds of lubricating oils and the effect on the pour point of the solutions of copolymer in oil determined. The standard A. S. T. M. pour test (D97—47) was usually followed. It was supplemented in some instances with shock chilling and maximum pour tests. The maximum pour test is described in Proc A. S. T. M. 45, Appendix I, p. 245 (1945). The shock chilling determinations is made by observing the test sample during the initial cooling step with the cooling jacket at —60° F.

The oils used in these determinations were Oil I, a 150 Pennsylvania neutral having a pour point of +25° F. and a viscosity index of 106.9, Oil II, an S. A. E. 90 gear oil compounded from 30 parts of a 180 Pennsylvania neutral and 70 parts of a 150 Pennsylvania bright stock, also having a pour point of +25° F., and Oil III, a 500 Mid-Continent solvent-extracted neutral, S. A. E. 30, having a pour point of +25° F. The response of these oils to small amounts of copolymers of this invention is reported in the following paragraphs.

A copolymer from one mole of allyl stearate and 1.34 moles of 2-ethylhexyl methacrylate was dissolved in an amount of 0.5% in Oil I. The pour point of this solution was —25° F. At 0.25% this copolymer depressed the pour point of Oil I to —20° F. In Oil II at 0.1% it depressed the pour point at 10° F. In Oil III the pour point of a 0.5% solution of copolymer was determined under shock chilling, the jacket temperature being —60° F. The pour point thus found was —5° F.

Comparable data were obtained for a copolymer from one mole of allyl stearate and two moles of 2-ethylhexyl methacrylate. On the other hand, a copolymer formed from one mole of allyl stearate and 2.5 moles of 2-ethylhexyl methacrylate was ineffective.

A copolymer was prepared from one mole of allyl stearate and 1.5 moles of dodecyl methacrylate. A 30% solution of the copolymer in toluene had a viscosity of 30 cs. at 100° F. When dissolved in waxy oils, it gave marked lowering of the pour point in all cases. In Oil I at 0.5% the pour point was lowered to —25° F., at 0.25% to —25° F., and at 0.1% to —15° F. A solution of 0.1% in Oil II had a pour point of —5° F. In Oil III the pour point by shock chilling was —15° F. at a concentration of 0.1%.

A copolymer from allyl stearate and dodecyl methacrylate in a 1:2.3 ratio gave pour points as follows:

In Oil I at 0.5%—35° F., at 0.1%—20° F.;
In Oil II at 0.1%+10° F.;
In Oil III at 0.5%—20° F. by shock chilling and +5° F. by the maximum pour method. Another copolymer from the same monomers but in a ratio of 1:3.7 gave a pour point in Oil I at 0.5% of 10° F. Copolymers from these monomers in ratios of one to more than four are either ineffective or very poorly effective in reducing pour points.

A copolymer from allyl stearate and dodecyl methacrylate in a 1:1.2 ratio, having a molecular size such that a 30% solution of copolymer in toluene had a viscosity of 103 cs. at 100° F., was dissolved in Oil I. The 0.5% solution had a viscosity index of 115.2 and a 2% solution had a viscosity index of 127.2.

A copolymer from one mole of allyl tetracosanate and dodecyl methacrylate in a 1:3.6 ratio gave a pour point in Oil I at 0.5% of —5° F. and of 0° F. at 0.1% concentration.

A copolymer from one mole of allyl palmitate and 1.1 moles of octyl methacrylate depressed the pour point of Oil I at 0.5% by 50° F. At 0.25% in Oil I it depressed the pour point to —20° F. A 0.5% solution in Oil III had a pour point of —15° F. by shock chilling.

A copolymer from one mole of allyl stearate and 1.2 moles of isononyl methacrylate at 0.5% in Oil I gave a pour point of —20° F. In Oil III at 0.5% it gave a pour point of 0° F. by shock chilling.

A copolymer from one mole of 2-chloroallyl stearate and 1.25 moles of dodecyl methacrylate gave a pour point in Oil I at 0.5% of —30° F. and at 0.25% of —25° F.

A copolymer from methallyl stearate and 3,5,5-trimethylhexyl methacrylate in a 1:0.86 mole ratio (viscosity of a 30% solution in toluene being 3 cs. at 100° F.) gave a pour point of —15° F. at 0.5% and —5° F. at 0.25% in Oil I. A copolymer from the same monomers but in a 1:2.96 mole ratio failed to depress the pour points of the test oils.

A copolymer from methallyl stearate and dodecyl methacrylate in a 1:1.25 mole ratio (viscosity of a 30% solution in toluene being 177 cs. at 100° F.) gave a pour point of —30° F. at 0.5%, —25° F. at 0.25%, and —10° F. at 0.04% in Oil I.

A copolymer from allyl palmitate and n-hexyl methacrylate in a 1:1 ratio and of a size imparting a viscosity of 90 cs. at 100° F. to a 30% solution in toluene was dissolved in Oil I at 2%. This solution had a viscosity index of 138.7. A 0.5% solution in Oil I had a viscosity index of 119.7. The pour of this solution was —10° F.

A copolymer of allyl stearate and n-octyl methacrylate in a 1:1.5 mole ratio depressed the pour point of Oil I at 0.5% to —25° F. and at 0.1% to 0° F.; in Oil II at 0.1% to 10° F.; and Oil III at 0.5% to —15° F.

The copolymers of this invention are novel as to composition, depending both on choice of monomers and on relative amounts of monomers copolymerized. They are characterized by their oil-solubility and their capacity to depress the pour points of hydrocarbon fluids which have waxy pour points. They are thus effective in lubricating oils and other liquids from paraffinic and naphthenic stocks. Since these copolymers can be carried to fairly large molecular sizes, ranging up to 50,000, they may also be used to thicken oils and to improve viscosity-temperature relationships. They are stable polymers and are not readily depolymerized by heat. They are compatible with other types of oil additives, such as anti-oxidants, extreme pressure additives, oiliness agents, detergents, and the like.

Compositions consisting essentially of a hydrocarbon fluid and a copolymer of this invention have an improved utility over that of the fluid alone. Where the fluid has a waxy pour point, this point is lowered by the presence of 0.05% to 5% of a copolymer as here defined. While such effect is commonly desired for lubricating oils, it is not confined to such oils. The copolymers may also be used in fuel oils and diesel fuels which would otherwise have high congealing points. The presence of such small amounts of copolymer in no way interferes with the normal functioning in these various hydrocarbon fluids.

We claim:

1. A copolymer of (A) an ester of an alkanoic acid having a chain of sixteen to twenty-four carbon atoms and an alcohol selected from the class consisting of allyl, methallyl, and 2-chloroallyl alcohols and (B) an ester of methacrylic acid and a saturated aliphatic monohydric alcohol having an alkyl group of six to twelve carbon atoms, the proportion of ester (A) to ester (B) being defined by ratios from one mole of the first ester to one-half mole of the latter up to one mole of the first to a number of moles of the latter equal to one third of the number of carbon atoms in the longest chain of the latter.

2. A copolymer of allyl stearate and dodecyl methacrylate, the ratio of the groups from the stearate to the groups from the methacrylate being from 1:0.5 to 1:4.

3. A copolymer of allyl stearate and octyl methacrylate, the ratio of groups from the stearate to the groups from the methacrylate being from 1:0.5 to 1:2.67.

4. A copolymer of methallyl stearate and dodecyl methacrylate, the ratio of groups from the stearate to the groups from the methacrylate being from 1:0.5 to 1:4.

LA VERNE N. BAUER.
HARRY T. NEHER.
WILLIAM L. VAN HORNE.

REFERENCES CITED

The following references are of record in the file of this patent:

UNITED STATES PATENTS

| Number | Name | Date |
|---|---|---|
| 2,125,885 | Bruson | Aug. 9, 1938 |
| 2,129,664 | Barrett | Sept. 13, 1938 |
| 2,407,954 | Fenske et al. | Sept. 17, 1946 |
| 2,419,221 | Kenyon | Apr. 22, 1947 |
| 2,440,318 | White | Apr. 27, 1948 |
| 2,441,023 | Larsen | May 4, 1948 |
| 2,524,563 | Evans et al. | Oct. 3, 1950 |

OTHER REFERENCES

"Allyl Alcohol" by Shell Develop., 1946, page 27 pertinent.